United States Patent [19]

Kobelt

[11] 3,783,742
[45] Jan. 8, 1974

[54] REMOTE ROTARY CONTROL
[76] Inventor: Jack R. Kobelt, 235 E. 5th Ave., Vancouver, Canada
[22] Filed: July 27, 1972
[21] Appl. No.: 275,489

[52] U.S. Cl............................ 91/413, 91/476, 91/480
[51] Int. Cl.............................................. F15b 11/18
[58] Field of Search.................. 91/411 R, 413, 472, 91/476, 477, 480, 481, 496, 35, 36, 37; 92/84

[56] References Cited
UNITED STATES PATENTS

| | | | |
|---|---|---|---|
| 2,228,700 | 1/1941 | Hamner et al. | 91/36 |
| 2,604,078 | 7/1952 | Chelminski | 91/413 X |
| 3,227,053 | 1/1966 | Spalding | 92/130 X |
| 387,234 | 8/1888 | Hutchinson | 92/84 |
| 691,078 | 1/1902 | Schiller | 92/84 X |
| 1,199,640 | 9/1916 | Vincent | 91/413 X |

*Primary Examiner*—Edgar W. Geoghegan

[57] ABSTRACT

This disclosure pertains to that class of remote rotary controls wherein an actuated rotary element situate remote from a control rotary element duplicates or reproduces the rotary action of the control element. More particularly, my present invention provides for a remote rotary following action which is infinitely variable and infinitely continuous in either direction of rotation. A rotary control head and a rotary actuator are rotatably mounted on a common base means. A cam integral to the control head sequentially actuates a plurality of pressure varying control valves as the head is rotated. Each of the control valves is duct connected to one of a plurality of linear actuators mounted on the base means. Each of the linear actuators is interconnected to an extensible and retractable fluid controlled actuator link; each actuator link is interconnected to the rotary actuator. Each linear actuator is duct connected for fluid flow through a shuttle-valve to the actuator link of an adjacent linear actuator whereby the fluid pressure in each actuator link is substantially inversely proportional to the fluid pressure in its interconnected linear actuator. Sequential actuation of the plurality of control valves by rotation of the control head causes sequential operation of each linear actuator whereby the rotary actuator reproduces the rotation of the control head.

9 Claims, 1 Drawing Figure

PATENTED JAN 8 1974
3,783,742
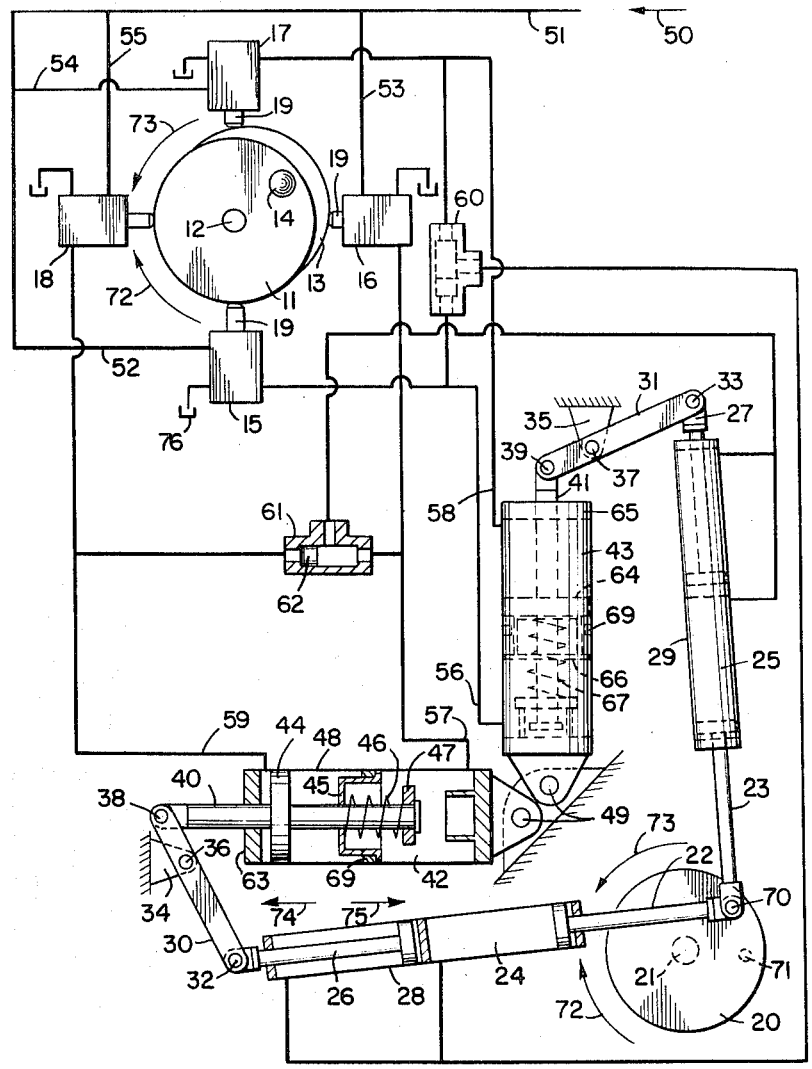

REMOTE ROTARY CONTROL

This invention relates to that class of rotary controls where a rotary actuator is required to reproduce the rotary motion of a rotary control head located remote from the rotary actuator. More specifically, in my invention the rotary motion of the rotary actuator and control head are infinitely variable and infinitely continuous in either rotary direction.

My invention is directed toward providing remotely controlled continuous rotary movement in either direction in machine elements, mechanical devices, steering devices, scanning equipment, propulsion systems, and monitoring systems. Specifically, it has already found application in controlling a combined steering and propulsion system on a water-borne vessel.

In fluid control devices such as valves and linear actuators, control may be on-off controlled, volume controlled, or pressure controlled. My invention is of the latter type, wherein the system fluid pressure is varied and controlled by mechanically actuated pressure control valves of conventional design. Remote control is provided by linear actuators in which the fluid pressure is resisted by mechanical springs; the linear actuators may be single acting with a normal position at one stroke extremity or double-acting and self-centering. A pressure control valve is required for each direction of linear actuator movement. For example, a double-acting self-centering linear actuator requires two pressure control valves. It will be evident to one skilled in the art that for continuous rotary motion, at least two linear actuators are required in a position relationship whereby each overcomes the dead over-center position of the other. Furthermore, a pair of double-acting self-centering linear actuators located substantially perpendicular to one another are equivalent to four single-acting linear actuators evenly spaced around a circle. It will be still further evident that the accuracy of the rotary movement reproduced remotely by the linear actuators will be dependent on the accuracy of the springs in the control valves and linear actuators; therefore, the greater the number of control valves and linear actuators, the less the portion of a 360° rotary cycle covered by each linear actuator and, hence, the greater the control accuracy.

In the preferred embodiment shown herein, a compromise is struck by employing a pair of double-acting self-centering linear actuators wherein fluid pressure in each direction in each of the linear actuators is opposed by one precision mechanical spring. To further offset secondary effects of high stress in these springs and to eliminate secondary binding effects in the dead over-center region of each linear actuator, a fluid controlled actuator link interconnects each linear actuator to a rotary actuator. By duct-connecting each linear actuator through a shuttle valve to the actuator link of the other linear actuator, the control force of each linear actuator is inversely proportional to its own fluid pressure, and substantially zero in the dead over-center region of rotary actuation. By making the extensible and retractable strokes of the actuator links each equal to or greater than the diameter of the rotary actuator control circle, the control mechanism is self-relieving in the event that the rotary actuator is fixed and the control head is turned.

Therefore, it is one object of this invention to provide a remote rotary control which is infinitely variable and infinitely continuous in either rotary direction.

It is another object of this invention to provide a remote rotary control which is fluid pressure controlled by means of pressure varying control valves.

Yet another object of this invention is to provide a remote rotary control in which fluid pressure is resisted and control positioning achieved by precise mechanical springs.

Still a further object of this invention is to use a plurality of linear actuators to achieve continuous rotation of a rotary actuator, one linear actuator being effective in the ineffective over-center region of another, sequential actuation of each linear actuator being controlled by sequential operation of pressure varying control valves by a control head.

A further object of my invention is to provide a remote rotary control wherein a plurality of linear actuators are interconnected to extensible and retractable actuator links which apply a non-binding actuation force to a rotary actuator.

Another object of this invention is to provide a remote rotary control wherein a plurality of linear actuators are interconnected to fluid controlled extensible and retractable actuator links, each actuator link duct-connected for fluid flow to an adjacent linear actuator whereby the force of each actuator link on a rotary actuator is inversely proportional to the pressure in the linear actuator to which it is connected.

Still a further object of this invention is to provide a remote rotary control wherein each linear actuator and the linkage thereto connected is protected from over-stressing by the extensibility and retractability of actuator links.

Still further objects and advantages of the present invention reside in the details of construction of the embodiment of the invention disclosed herein.

These and further objects of the invention will be evident from a study of the following disclosure and accompanying drawing which illustrates improved details of construction of a preferred embodiment of my invention. This embodiment is merely exemplary and is not intended to detract from the full scope of the invention as set out in the annexed claims.

In the drawing wherein like numerals refer to like parts, the lone FIGURE is a schematic diagram showing the pertinent details of construction in my invention.

Turning now to the drawing, control head 11 is rotatably mounted on a base means not shown by means of pin 12. The term "base means" is used here to designate the ground, a frame, the body of a vessel, a control console, or other such reference body. Radial cam means 13 forms an integral part of control head 11. Handle 14 is provided for manual rotation of control head 11, while it is understood that such rotation could be achieved by mechanical, electrical, and other means.

A plurality of pressure varying control valves, that is, valves 15, 16, 17, and 18, are spaced substantially evenly about control head 11 and mounted on the base means not shown. Cam following means 19 interconnect valves 15, 16, 17, and 18 to cam means 13.

At a location on the base means remote from control head 11, rotatably mounted on the base means is rotary actuator 20 having actuator shaft 21; actuator shaft 21 transmits the rotation of rotary actuator 20 to the device ultimately to be controlled, such as a steering wheel or rudder. Pivotally connected together and to rotary actuator 20 by pin 70 are rod portions 22 and 23 of actuator links 24 and 25. The latter further comprise tension rod portions 26 and 27, and cylinder portions 28 and 29. Rod portions 26 and 27 are pivotally interconnected to levers 30 and 31 by means of pins 32 and 33. Levers 30 and 31 are pivotally mounted on the base means by brackets 34 and 35 and by pins 36 and 37. Levers 30 and 31 are further pivotally interconnected by pins 38 and 39 to rod portions 40 and 41 of double-acting self-centering linear actuators 42 and 43. Linear actuator 42 is typical and comprises piston 44 on rod 40, spring cup 45, spring 46, spring bearing 47, and cylinder portion 48 pivotally mounted on the base means by pin 49.

A fluid supply enters the control duct system in direction 50 at duct 51 and is distributed to valves 15, 16, 17, and 18 by means respectively of ducts 52, 53, 54 and 55. Fluid flows, at a pressure determined by the measure of depression of cam follower means 19 through the valves 15, 16, 17, and 18 respectively to the linear actuators at ports 56, 57, 58, and 59. Ducts from ports 56 and 58 are interconnected to shuttle-valve 60 and ducts 57 and 59 are interconnected by shuttle valve 61. Shuttle 62 moves to one or the other end of valve 61 thereby permitting flow between ports 57 or 59 of linear actuator 42 and actuator link 25. Clearly shuttle valve 60 permits flow between ports 56 or 58 of linear actuator 43 and actuator link 24.

Turning now to the operation of the remote rotary control, it can be seen that cam follower means 19 of valves 16 and 17 are approximately half depressed, the pressure at ports 57 and 58 being roughly half of a possible maximum. Therefore, piston 44 is moved toward end 63 of actuator 42, and spring 46 is compressed. Piston 64 moves away from centering lip 69, and spring 67 is compressed. It can readily be seen that pin 70 is therefore in a location substantially the same as the position of handle 14, rod 22 being under compression and rod 23 under tension. Furthermore, it will readily be seen that when, for example, handle 14 is directly opposite valve 16, cam follower means 19 of valve 16 will be fully depressed and cam follower means 19 of valves 15, 17, and 18 will be fully extended; therefore the pressure at port 57 will be the maximum, piston 44 will be hard against end 63 of actuator 42, piston 64 will be centered and pin 70 will be moved to location 71. In like manner, it can be shown that a small movement of only a few degrees or a large movement of several revolutions of handle 14, in either direction 72 or 73, will be duplicated by pin 70. When pin 70 is in position 71, valves 15 and 17 being closed, the pressure in actuator link 24 is substantially zero, the pressure in actuator link 25 is maximum, and the position of pin 70 is determined by the self-centered position of actuator 43. Likewise there exists three other such positions of pin 70 determined by self-centered positions of actuators 42 and 43. Pressure is relieved by exhaust ports 76 when cam followers 19 return from their furthermost depressed position.

It should be noted that spring 46 being compressed for movement of piston 44 in either direction 74 or 75, the pressure at port 59 must be slightly higher than that in port 57, depending on the size of rod 40; this can be compensated for by preset spring forces in valves 16 and 18. This applies of course as well to linear actuator 43 and valves 15 and 17.

It should further be noted that the compression force is greater than the tension force of actuator link 24, depending on the size of rod 26. This applies as well to actuator link 25. If the compression stroke of rod 22 and the tension stroke of rod 26 are each equal to the diameter of the circle described by a full rotation of pin 70, then should it occur that rotary actuator 20 or shaft 21 are fixed when an attempt to rotate control head 11 is made, the required lost motion may be taken up in actuator links 24 and 25, irrespective of the fixed position of pin 70.

It will be appreciated that the foregoing discloses only a preferred embodiment of my present invention. Further, many changes, modifications, and equivalents will readily occur to one skilled in the art, particularly in view of the above teachings. For instance, cam means 13 could be an axial extension of control head 11, valves 15, 16, 17 and 18 being mounted and spaced axially rather than radially. Actuator link 24 could be direct coupled to linear actuator 42 without using link 30, link 30 being used primarily for space considerations. Various combinations of single-acting and double acting linear actuators are feasible. Various methods of clevis, tension, and fixed base mounting are possible for linear actuators 42 and 43. Actuator link 24 could be a lost-motion spring link wherein mechanical springs retract rod 26 and extend rod 22. Therefore, the present invention is not to be construed as limited to the specific details illustrated and described above.

1. A remote rotary control comprising a control head rotatably mounted on a base means, a rotary actuator rotatably mounted on said base means, a plurality of linear actuators operatively mounted on said base means (and interconnected to said rotary actuator), each of said linear actuators interconnected to an actuator link, each of said actuator links interconnected to said rotary actuator and comprising a cylinder portion and two rod portions, a plurality of pressure varying control valves operatively connected to said control head, one of said pressure varying control valves duct connected for fluid flow to each of said linear actuators, rotary motion of said control head sequentially raising and lowering fluid pressure in said linear actuators whereby said rotary actuator reproduces said rotary motion.

2. A remote rotary control as defined in claim 1, wherein spring means within said linear actuators opposes the force of said fluid pressure.

3. A remote rotary control as defined in claim 1, wherein said control head includes cam means, cam following means interconnecting said plurality of pressure control valves to said cam means.

4. A remote rotary control as defined in claim 1, wherein said linear actuators are double-acting and self-centering; one of said plurality of pressure varying control valves controlling actuation of each of said linear actuators in each direction.

5. A remote rotary control as defined in claim 1, (wherein each of said linear actuators is interconnected to an actuator link, each of said actuator links is interconnected to said rotary actuator, said actuator link comprising a cylinder portion and two rod portions,) including constant fluid pressure within said actuator link retracting one of said rod portions and extending the other of said rod portions, said actuator link increasing or decreasing in length whereby to apply a substantially constant force to said rotary actuator.

6. A remote rotary control as defined in claim (4) 1, wherein (each of said linear actuators is interconnected to a fluid controlled actuator link each of said actuator links is interconnected to said rotary actuator), each of said linear actuators is duct connected for fluid flow to said actuator link of an adjacent linear actuator.

7. A remote rotary control as defined in claim 1, wherein said plurality of linear actuators comprise a pair of self-centering double-acting positioning cylinders acting substantially perpendicular to one another, (a pair of extensible and retractable fluid controlled actuator links one of which interconnects each of said linear actuators to said rotary actuator) each of said actuator links duct connected for fluid flow through a shuttle valve alternatively to each side of said linear actuator interconnected to the other of said actuator links, whereby the force of each of said linear actuators on said rotary actuator is inversely proportional to the fluid pressure in said linear actuator.

8. A remote rotary control as defined in claim (8) 1, wherein a lever is pivotally mounted on said base means, each of said linear actuators and its related actuator link pivotally interconnected to said lever.

9. A remote rotary control comprising a control head having cam means rotatably mounted on a base means, a rotary actuator rotatably mounted on said base means, a pair of double-acting self-centering linear actuators operatively mounted on said base means substantially perpendicular to each other, each of said linear actuators interconnected to an extensible and retractable fluid controlled actuator link, each of said actuator links interconnected to said rotary actuator, a plurality of pressure varying control valves operatively connected to said cam means, a fluid supply duct connected to each of said pressure varying control valves, one of said pressure varying control valves duct connected for fluid flow to each of said linear actuators, each of said actuator links duct connected for fluid flow through a shuttle valve to each side of said linear actuator which is interconnected to the other of said actuator links, rotary motion of said control head sequentially raising and lowering fluid pressure in said linear actuators whereby said rotary actuator reproduces said rotary motion.

* * * * *